(12) United States Patent
Ueda et al.

(10) Patent No.: US 7,393,578 B2
(45) Date of Patent: *Jul. 1, 2008

(54) PRECOATED METAL SHEET FOR LIGHT REFLECTORS

(75) Inventors: Kohei Ueda, Futtsu (JP); Hiroshi Kanai, Futtsu (JP); Ikuya Inoue, Kimitsu (JP); Nobukatsu Komatsu, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 10/545,619

(22) PCT Filed: Feb. 23, 2004

(86) PCT No.: PCT/JP2004/002050

§ 371 (c)(1),
(2), (4) Date: Aug. 15, 2005

(87) PCT Pub. No.: WO2004/076172

PCT Pub. Date: Sep. 10, 2004

(65) Prior Publication Data

US 2006/0147673 A1    Jul. 6, 2006

(30) Foreign Application Priority Data

| Feb. 25, 2003 | (JP) | ............................. 2003-047611 |
| Aug. 5, 2003 | (JP) | ............................. 2003-206052 |
| Oct. 28, 2003 | (JP) | ............................. 2003-367622 |

(51) Int. Cl.
*B32B 15/08* (2006.01)
*B32B 15/18* (2006.01)
*B32B 27/20* (2006.01)

(52) U.S. Cl. ........................ 428/141; 428/216; 428/421; 428/457

(58) Field of Classification Search ................. 428/141, 428/216, 421, 457
See application file for complete search history.

(56) References Cited

U.S. PATENT DOCUMENTS

| 4,985,815 A | 1/1991 | Endo |
| 2006/0147721 A1* | 7/2006 | Ueda et al. ................. 428/421 |

FOREIGN PATENT DOCUMENTS

| JP | 6-47870 | 2/1994 |
| JP | 10-730 | 1/1998 |
| JP | 10-732 | 1/1998 |
| JP | 10-258474 | 11/1998 |
| JP | 2000-66012 | 3/2000 |
| JP | 2001-96223 | 4/2001 |
| JP | 2002-172735 | 6/2002 |
| JP | 2002-228085 | 8/2002 |

OTHER PUBLICATIONS

English language translation of JP 2001-172735, Jun. 2002.*
* cited by examiner

*Primary Examiner*—Ramsey Zacharia
(74) *Attorney, Agent, or Firm*—Kenyon & Kenyon LLP

(57) ABSTRACT

The present invention provides a precoated metal sheet, for light reflectors, having a high diffuse reflectance of visible light, and also provides the electric or electronic apparatus using it. The precoated metal sheet comprises a metal sheet or plated metal sheet, a visible light reflective undercoat having a thickness of 3 to 30 micrometers provided on at least one surface of the metal sheet or plated metal sheet, and a visible light reflective overcoat having a thickness of 10 to 40 micrometers provided on the visible light reflective undercoat. The visible light reflective undercoat comprises a binder resin and a titanium oxide, a content of the titanium oxide in the visible light reflective undercoat being 40 to 150 parts by weight based on 100 parts by weight of a solid content of the binder resin, and the visible light reflective overcoat comprises a fluororesin-containing binder resin and a titanium oxide, a content of the titanium oxide in the visible light reflective overcoat being 40 to 150 parts by weight based on 100 parts by weight of a solid content of the binder resin.

10 Claims, 1 Drawing Sheet

PRECOATED METAL SHEET FOR LIGHT REFLECTORS

TECHNICAL FIELD

The present invention relates to a precoated metal sheet used as a material of a light reflector and to an electric or electronic apparatus which has a function to emit a visible ray and has a plate for reflecting the emitted visible ray, such as an illuminator, audiovisual equipment, mobile computing devices, a plasma display, and a liquid crystal television set.

BACKGROUND ART

An illuminator, audiovisual equipment, an electronic apparatus, mobile computing devices, a liquid crystal television, a plasma display, and the like have functions of making the surroundings bright, transmitting a light signal, projecting an optical image or the like, by emitting visible rays. Some of these apparatus have a light reflector and improve the luminance of light or change the direction of light by reflecting light on the reflector. Therefore, in order to avoid a drop in the quantity of light when light is reflected by a reflector, the surface of the reflector requires a high visible ray reflectance. As means for improving the reflectance of the surface of a reflector in the past, for example, a metal has been polished to make a mirror plane, or a white coating material with a high reflectance has been coated. Nippon Steel Corporation catalog "View coat" discloses a precoated steel sheet coated with a white coating material beforehand for light reflectors of an illuminator.

Japanese Unexamined Patent Publication No. Hei 10-000730 discloses a light reflecting film excellent as a light reflector for a liquid crystal display, comprising a substrate film, a thin metal film layer laminated on one side of the substrate film, and a fine inorganic particle-containing resin layer laminated on the thin metal film layer, wherein the thin metal film layer is made of aluminum, and the reflective indices $n_f$ and $n_b$ satisfy the relationship $n_f - n_b \geq 0.4$ in which $n_f$ is the refractive index of the fine inorganic particle and $n_b$ is the refractive index of the resin. Japanese Unexamined Patent Publication No. 2002-172735 discloses a highly diffusing reflective coated metal panel used as a reflecting plate for the back light of a liquid crystal display, comprising an aluminum panel, an undercoat layer formed on the aluminum panel, and a topcoat layer formed on the undercoat layer, wherein the undercoat layer contains 100 parts by weight of a resin and 150 to 300 parts by weight of a titanium oxide pigment and has a film thickness of 50 to 100 micrometers, and the topcoat layer contains 100 parts by weight of a resin and 100 to 250 parts by weight of a titanium oxide pigment and has a gloss of not more than 15 and a film thickness of 10 to 30 micrometers. However, the need of forming a light reflector used for an illuminator and for an electric apparatus, such as a liquid crystal display, into various shapes before use has been increasing with complication of the structure and design of an electric apparatus in recent years.

However, when a film is used as a substrate as described in Japanese Unexamined Patent Publication No. Hei 10-000730, it is difficult to form a film, laminated with a metal thin film layer or a resin layer containing fine inorganic particles beforehand, into a target shape. Therefore, the film must be formed into the target shape in advance before laminating the metal thin film layer or the resin layer containing fine inorganic particles. However, when a shape of a light reflector is complicated, it is difficult to laminate a coat, on the formed part, with a uniform thickness.

On the other hand, according to the technique described in Japanese Unexamined Patent Publication No. 2002-172735, after applying an undercoat layer and a topcoat layer to an aluminum plate beforehand, the coated aluminum plate can be formed into a target shape. However, as the amount of titanium oxide added in a reflective coat was too high, the coat was weak, and there were problems that cracks occurred in the reflective coat or the coat peeled at the time of forming. Moreover, it also has a weak point that formed shapes are limited because aluminum, which is a base metal, has a poor forming workability. Furthermore, it is very difficult to coat an undercoat with such a thickness (50 to 100 micrometers) at one time by a roll coater on a common precoating line, and it is necessary to coat two or more times, and therefore there is a weak point of low productivity.

Consequently, it was difficult to apply the light reflector described in Japanese Unexamined Patent Publications No. Hei 10-000730 or No. 2002-172735 to an electric apparatus which must employ a light reflector formed into a certain shape for the reasons of the structure or design of the electric apparatus, and a conventional precoated steel sheet for light reflectors of illuminators which was beforehand coated with a white paint was employed.

On the other hand, the problem of generation of heat of an electric apparatus is occurring, with the computerization of electric apparatus, in recent years. As means to solve this heat problem, Japanese Unexamined Patent Publication No. 2002-228085 discloses a technique for improving heat radiative property by making the emissivity of thermal radiation of the inner layer coating film on a metal surface not less than 70 percent.

DISCLOSURE OF INVENTION

There is a growing demand for the above-mentioned electric apparatus to be brighter or to have the same brightness in spite of less electric power consumption. There is also a growing demand for an electric apparatus which must employ a light reflector formed into a certain shape to be brighter and to have the same brightness in spite of less electric power consumption.

The present invention aims at providing a precoated metal sheet for light reflectors having an increased diffuse reflectance of visible rays, and an electric or electronic apparatus using the same.

The inventors found that a precoated metal sheet excellent in workability and reflectivity can be obtained by coating a metal sheet or plated metal sheet with a visible light reflective undercoat composed of a binder resin and a titanium oxide and a visible light reflective overcoat composed of a fluororesin-containing binder resin and a titanium oxide, as a result of study. The reason why the visible light reflective overcoat according to the present invention comprises a fluororesin-containing binder resin and a titanium oxide is that a fluororesin-containing binder resin has a low refractive index among resins, and a titanium oxide has a very high refractive index compared with other pigments and, therefore, the refractive index difference between the binder resin and the titanium oxide becomes very large, and visible rays are more reflected on the interfaces between the fluororesin-containing binder resin and titanium oxide in the coat, and then the reflectance becomes high. The larger the gross area of the interfaces between the fluororesin-containing binder resin and a titanium oxide which are formed in the coat is, the higher the reflectivity becomes.

The inventors also found the following:

When a titanium oxide is added to a fluororesin-containing binder resin, if a content of titanium oxide is too small, a visible ray transmits through the coat, or the visible ray reflectivity of the coat is low because the gross area of the interfaces between the binder resin and the titanium oxide is small. As the content of titanium oxide increases, a visible ray transmittance through the coat decreases and the gross area of the interfaces between the binder resin and the titanium oxide increases and, therefore, the visible ray reflectivity of the coat improves. It was found, however, that if the content of titanium oxide is more than a certain amount, a volume of titanium oxide is much larger than a volume of the binder resin, and the interfaces between the binder resin and the titanium oxide decreased conversely, and then the visible ray reflectivity declines.

The present inventions have been achieved based on this knowledge and are as follows:

(1) A precoated metal sheet, for light reflectors, comprising a metal sheet or plated metal sheet, a visible light reflective undercoat having a thickness of 3 to 30 micrometers provided on at least one surface of the metal sheet or plated metal sheet, and a visible light reflective overcoat having a thickness of 10 to 40 micrometers provided on the visible light reflective undercoat, wherein the visible light reflective undercoat comprises a binder resin and a titanium oxide, a content of the titanium oxide in the visible light reflective undercoat being 40 to 150 parts by weight based on 100 parts by weight of a solid content of the binder resin in the visible light reflective undercoat, and the visible light reflective overcoat comprises a fluororesin-containing binder resin and a titanium oxide, a content of the titanium oxide in the visible light reflective overcoat being 40 to 150 parts by weight based on 100 parts by weight of a solid content of the binder resin in the visible light reflective overcoat.

(2) A precoated metal sheet for light reflectors according to (1) mentioned above, wherein the visible light reflective overcoat has a thickness of 10 to 30 micrometers.

(3) A precoated metal sheet for light reflectors according to (1) or (2) mentioned above, wherein the fluororesin contained in the binder resin of the visible light reflective overcoat is a trifluoroethylene resin.

(4) A precoated metal sheet for light reflectors according to any one of (1) to (3) mentioned above, wherein at least one of the visible light reflective undercoat and the visible light reflective overcoat consists only of a binder resin and a titanium oxide.

(5) A precoated metal sheet for light reflectors according to any one of (1) to (4) mentioned above, wherein at least one of the visible light reflective undercoat and the visible light reflective overcoat comprises at least one of a silica and a silica-based pigment.

(6) A precoated metal sheet for light reflectors according to (5) mentioned above, wherein the silica-based pigment is a metal ion-adsorbed silica.

(7) A precoated metal sheet for light reflectors according to any one of (1) to (6) mentioned above, comprising a visible light reflective undercoat and a visible light reflective overcoat on one surface of the metal sheet or plated metal sheet and, further, a heat absorptive coat on the other surface of the metal sheet or plated metal sheet, wherein the heat absorptive coat has a total emissivity of infrared rays of not less than 0.7 in the range of wave number of 600 to 3,000 cm$^{-1}$ measured at a certain temperature within the range of from 80 to 200 degrees centigrade.

(8) A precoated metal sheet for light reflectors according to any one of (1) to (7) mentioned above, wherein the surface roughness Ra of the metal sheet or plated metal sheet is 0.05 to 1.8 micrometers.

(9) A precoated metal sheet for light reflectors according to any one of (1) to (8) mentioned above, wherein the metal sheet or plated metal sheet is a steel sheet or a plated steel sheet.

(10) An electric or electronic apparatus comprising a precoated metal sheet for light reflectors according to any one of (1) to (9) mentioned above.

BEST MODE FOR CARRYING OUT THE INVENTION

Light of a fluorescent lamp or electric bulb used as illuminators and light used for a light signal and the like are both visible rays. Therefore, if a diffuse reflectance of visible rays on the surface of a light reflector is more improved, the light will become bright as a whole. A diffuse reflectance of visible rays varies with a substance of a light reflector surface. Aluminum, silver, titanium oxides, barium sulfate, zinc oxides, and the like are known as substances having high diffuse reflectances of visible rays. Therefore, a light reflector having a high reflectance is now made by using such technology, and it is thought that it is difficult to improve the reflectance.

The inventors have found that a precoated metal sheet excellent in workability and reflectivity can be obtained by coating a metal sheet or plated metal sheet with a visible light reflective undercoat composed of a binder resin and a titanium oxide and a visible light reflective overcoat composed of a fluororesin-containing binder resin and a titanium oxide.

Figure 1:
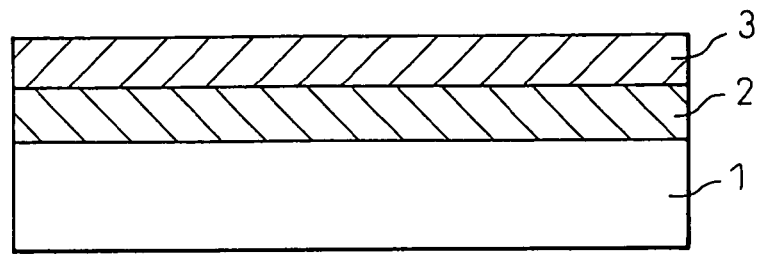
FIG. 1 is a schematic sectional view illustrating one embodiment of a precoated metal sheet according to the present invention.

One embodiment of a precoated metal sheet for light reflectors of the present invention is illustrated in FIG. 1. It comprises a metal sheet or plated metal sheet 1, a visible light reflective undercoat 2 having a thickness of 3 to 30 micrometers provided on at least one surface of the metal sheet or plated metal sheet 1, and a visible light reflective overcoat 3 having a thickness of 10 to 40 micrometers, preferably 10 to 30 micrometers, provided on the visible light reflective undercoat 2, wherein the visible light reflective undercoat 2 comprises a binder resin and a titanium oxide, a content of the titanium oxide in the visible light reflective undercoat 2 being 40 to 150 parts by weight based on 100 parts by weight of a solid content of the binder resin, and the visible light reflective overcoat 3 comprises a fluororesin-containing binder resin and a titanium oxide, a content of the titanium oxide in the visible light reflective overcoat 3 being 40 to 150 parts by weight based on 100 parts by weight of a solid content of the binder resin. It is preferred that both surfaces of the metal sheet or plated metal sheet 1 are coated with the visible light reflective undercoat 2 and visible light reflective overcoat 3 because visible rays generated within an electric or electronic apparatus becomes brighter. Hereinafter, the total coat consisting of the visible light reflective undercoat and the visible light reflective overcoat is sometimes referred to as a visible light reflective coat.

It is not preferable that the thickness of the visible light reflective undercoat is less than 3 micrometers because the reflectivity declines. It is also not preferable that the thickness of the visible light reflective undercoat is more than 30 micrometers because it is difficult to apply such a coat by a roll coater or a curtain coater. It is not preferable that the thickness of the visible light reflective overcoat is less than 10 micrometers because the reflectivity declines. It is also not preferable that the thickness of the visible light reflective overcoat is more than 40 micrometers because it is difficult to apply such a coat by a roll coater or a curtain coater. A total thickness of the visible light reflective undercoat and the visible light reflective overcoat is preferably 20 to 60 micrometers, more preferably 20 to 50 micrometers.

A binder resin used for the visible light reflective undercoat may be a publicly known resin. Examples thereof include polyester resins, urethane resins, acrylic resins, epoxy resins, melamine resins, vinyl chloride resins, fluororesins, and the like. The resin may be either thermoplastic or thermosetting. Several types of these resins may be used together as required. Among these resins, a resin is not limited, but is necessary to select it suitably because the performances, such as workability, adhesion, hardness, of the coat vary with the type, molecular weight, or glass transition temperature (Tg) of resins. When using a resin which is cured by a crosslinking agent, the performances, such as workability, adhesion, hardness, of the coat vary with a type of a crosslinking agent and an addition amount thereof, and a type of a catalyst used in crosslinking reaction and an addition amount thereof, which are not limited but are selected suitably as required. The resin may be solid, water-soluble, or water-dispersed emulsion. When a solid resin is used, it can be thermofused, dissolved in an organic solvent, or pulverized into powder in advance. Ultraviolet (UV) curable resins and electron beam (EB) curable resins may be also used. Such a resin is preferably a resin which can be dissolved in a solvent to prepare a coating material so that it can be applied by a roll coater, a curtain coater, or the like. Commercially available coating resins may be used as the binder resin.

According to the knowledge which the inventors have gained, solvent-based melamine-curable polyester binders, solvent-based isocyanate-curable polyester binders, and water-dispersed acrylic emulsion binders are preferred as the binder. Particularly preferred examples of the binder include, but are not limited to, the following.

As to a solvent-based melamine-curable polyester binder, a number average molecular weight of a polyester resin is preferably from 2,000 to 30,000, a Tg of a polyester resin is preferably from −10 to 70 degrees centigrade, and an addition amount of a melamine resin is preferably from 5 to 70 parts by weight based on 100 parts by weight of the polyester resin. It is not preferable that the molecular weight of the polyester resin is less than 2,000 because the workability of the coat declines. It is also not preferable that the molecular weight is more than 30,000 because a viscosity of a solution of the resin dissolved in a solvent is too high. It is not preferable that a Tg of the polyester resin is less than −10 degrees centigrade because a coat cannot be formed. It is also not preferable that the Tg is more than 70 degrees centigrade because the coat is too hard and the workability declines. It is not preferable that the addition amount of the melamine is less than 5 parts by weight, based on 100 parts by weight of the polyester resin, because the coat is uncured. It is also not preferable that the addition amount is more than 70 parts by weight because the coat is too hard and the workability declines. A polyester resin to be used may be a commercially available one, examples of which include "VYLON™" by Toyobo Co., Ltd. and "Desmophen™" by Sumitomo Bayer Urethane Co., Ltd. A melamine resin to be used may also be a commercially available one, examples of which include "CYMEL™" and "MYCOAT™" by Mitsui Cytec, Ltd., and "BECKHAMIN™" and "SUPERBECKHAMIN™" by Dainippon Ink & Chemicals, Inc.

Regarding the solvent-based isocyanate-curable polyester binder, a number average molecular weight of a polyester resin is preferably from 2,000 to 30,000, a Tg of a polyester resin is preferably from −10 to 70 degrees centigrade, and an addition amount of isocyanate is preferably such that a value of [NCO group of isocyanate in equivalents]/[OH group of polyester resin in equivalents] is from 0.8 to 1.2. When the value of [NCO group of isocyanate in equivalents]/[OH group of polyester resin in equivalents] is less than 0.8 or more than 1.2, the coat tends to be uncured when the coat is formed. It is not preferable that the molecular weight of the polyester resin is less than 2,000 because the workability of the coat declines. It is also not preferable that the molecular weight is more than 30,000 because a viscosity of a solution of the resin dissolved in a solvent is too high. It is not preferable that a Tg of the polyester resin is less than −10 degrees centigrade because a coat cannot be formed. It is also not preferable that a Tg of the polyester resin is more than 70 degrees centigrade because the coat is too hard and the workability declines. A polyester resin to be used may be a commercially available one, examples of which include "VYLON™" by Toyobo Co., Ltd. and "Desmophen™" by Sumitomo Bayer Urethane Co., Ltd. An isocyanate to be used may be also a commercially available one, examples of which include "Sumidur™" and "Desmodur™" by Sumitomo Bayer Urethane Co., Ltd., and "Takenate™" by Mitsui Takeda Chemicals, Inc.

A water-dispersed acrylic emulsion binder to be used may also be a publicly known one or a commercially available one. When a water-dispersed acrylic emulsion binder is used, a publicly known highly adhesive resin such as an epoxy resin may be added to the binder. The type and content of the epoxy resin can be selected suitably, if needed, because they have an influence on the performance of the coat. A water-based resin such as a water-dispersed acrylic resin is more preferable because the coating workability is high, there is not a problem of releasing a volatile organic solvent into the atmosphere, and there are no need to build of an exhaust duct and combustion equipment for a volatile organic solvent in a coater.

It is not preferable that a content of the titanium oxide in the visible light reflective undercoat is less than 40 parts by weight based on 100 parts by weight of a solid content of the binder resin because the reflectivity declines. It is also not preferable that a content of the titanium oxide in the visible light reflective undercoat is more than 150 parts by weight based on 100 parts by weight of a solid content of the binder resin because the workability of the coat declines although the reflectivity does not improve much. A content of the titanium oxide in the visible light reflective undercoat is preferably 65 to 150 parts by weight based on 100 parts by weight of a solid content of the binder resin.

Publicly known fluororesins, such as trifluoroethylene resins, tetrafluoroethylene resins, and vinylidene fluoride resins, can be used as a fluororesin-containing binder resin constituting the visible light reflective overcoat. The resin may be a homopolymer or a copolymer with another resin monomer. A fluororesin blended with another resin may be used as a fluororesin-containing binder resin. However, a coat having a high fluorine concentration is preferable. It is more preferable that a trifluoroethylene resin is used because a fluorine concentration in the coat is high, and it is easy to prepare a coating material. In the present invention, a trifluoroethylene resin is defined as a resin comprising a poymer having a repeating unit —$CF_2$—CFX—, wherein X is hydrogen or a halogen other than fluorine. Examples of a trifluoroethylene resin include a poly(chlorotrifluoroethylene). The fluororesin-containing binder resin may be a commercially available fluorine-based coating resin, examples of which include "Kynar™" series which are vinylidene fluoride homopolymers by ATOFINA Chemicals, Inc., and "LUMIFLON™" series which are copolymers of trifluoroethylene resin and another resin by Asahi Glass Co., Ltd. When a vinylidene fluoride homopolymer is used, it is commonly blended with an acrylic resin before use. These resins may be crosslinked, if needed, by a publicly known crosslinking agent such as isocyanate or a melamine resin. An isocyanate to be used may be a commercially available one, examples of which include "Sumidur™" and "Desmodur™" by Sumitomo Bayer Urethane Co., Ltd., and "Takenate™" by Mitsui Takeda Chemicals, Inc. A melamine resin to be used may be a commercially available one, examples of which include "Cymel™" and "MYCOAT™" by Mitsui Cytec, Ltd., and "BECKHAMIN™" and "SUPERBECKHAMIN™" by Dainippon Ink & Chemicals, Inc. It is not necessary to use a crosslinking agent. It is preferable that an amount of a crosslinking agent added is not more than 20 parts by weight based on 100 parts by weight of the total resins including a fluororesin because a fluorine concentration in the coat becomes higher and the visible light diffuse reflectance is also improved. It is more preferred that a trifluoroethylene resin having a hydroxyl value of not more than 10 mg-KOH/g is used and an amount of a crosslinking agent added is not more than 20 parts by weight, based on 100 parts by weight of the total resins including the trifluoroethylene resin, because the diffuse reflectance of visible rays is improved. This is because, when the hydroxyl value is not more than 10 mg-KOH/g, the coat is crosslinked by a small amount of crosslinking agent, or the coat is formed even if a crosslinking agent is not used, and a fluorine concentration in the coat becomes high.

The visible light reflective overcoat comprises a fluororesin-containing binder resin and a titanium oxide. This is because a difference between a refractive index of the fluororesin-containing binder resin and that of the titanium oxide is very large, and visible rays are more reflected on the interfaces between the fluororesin-containing binder resin and the titanium oxide in the coat, and then the reflectance becomes high. The larger the gross area of the interfaces between the fluororesin-containing binder resin and the titanium oxide which are formed in the coat is, the higher the reflectivity becomes. When a titanium oxide is added to a fluororesin-containing binder resin, if a content of the titanium oxide is too small, visible rays pass through the coat, or the visible ray reflectivity of the coat is low because the gross area of the interfaces between the binder resin and the titanium oxide is small. As the content of the titanium oxide increases, a visible ray transmittance through the coat decreases and the gross area of the interfaces between the binder resin and the titanium oxide increases and, therefore, the visible ray reflectivity of the coat improves. However, if the content of titanium oxide is more than a certain content, a volume of the titanium oxide is too larger than a volume of the binder resin, and the interfaces between the binder resin and the titanium oxide decreased conversely, and then the visible ray reflectivity declines. The gross area of the interfaces between the binder resin and the titanium oxide is largest when 40 to 150 parts by weight of the titanium oxide is added to 100 parts by weight of a solid content of the binder resin. It is not preferable that the content of the titanium oxide is less than 40 parts by weight or more than 150 parts by weight because the gross area of the interfaces between the binder resin and the titanium oxide decreases and the reflectivity declines. The content of the titanium oxide is preferably 65 to 150 parts by weight, more preferably 80 to 130 parts by weight, based on 100 parts by weight of a solid content of the binder resin.

Publicly known titanium oxides can be used as a titanium oxide used for the visible light reflective undercoat or the visible light reflective overcoat. Examples of the titanium oxide include "TIPAQUE™" by Ishihara Sangyo Kaisha, Ltd., and "TITANIX™" by Tayca Corp. However, there are a rutile type and an anatase type among publicly known titanium oxides, and a rutile type is preferably used for the present invention. An anatase type has a possibility of decomposing a binder of the coat, because it has a larger photocatalysis than a rutile type does. A surface of a titanium oxide may be treated with Al, Si, Zr, organic substances, or the like for purposes of reducing a photocatalysis, improving a pigment dispersibility, or improving a weather resistance of a pigment.

The visible light reflective undercoat and the visible light reflective overcoat preferably consist only of a binder resin and a titanium oxide because the diffuse reflectance of visible light is improved. If a pigment other than a titanium oxide is added in the visible light reflective undercoat or the visible light reflective overcoat, interfaces having a small difference of refractive index will occur between a binder resin and a pigment other than a titanium oxide and, therefore, a visible light diffuse reflectance of the coat declines. However, from a standpoint of appearance or corrosion protection, if necessary, a pigment or additive other than a titanium oxide, such as publicly known color pigments, rust preventing pigments, leveling agents, pigment dispersants, waxes, delustering agents, may be added to the visible light reflective undercoat or the visible light reflective overcoat.

It is preferable that a rust preventing pigment is added to the visible light reflective undercoat because the corrosion resistance of the precoated metal sheet is improved. A chromium-free rust preventing pigment is preferable. Among chromium-free rust preventing pigments, a calcium ion adsorbed silica alone or a combination of a calcium ion adsorbed silica and a phosphate-based rust preventing pigment is preferred because the corrosion resistance and press-formability of the precoated metal sheet are excellent. A combination of a calcium ion adsorbed silica and aluminum triphosphate is more preferred. A delustering agent is preferably added to the visible light reflective undercoat or the visible light reflective overcoat as the means for reducing a visible light regular reflectance of the visible light reflective undercoat or the visible light reflective overcoat. Publicly known delustering agents can be used as a delustering agent in the visible light reflective undercoat or the visible light reflective overcoat, and silicas or silica-based delustering agents and the like are well-known.

When one surface of the metal sheet or plated metal sheet is coated with the visible light reflective undercoat and the visible light reflective overcoat, the other surface of the metal sheet or plated metal sheet is preferably coated with a heat absorptive coat because visible rays generated within an electric or electronic apparatus becomes brighter. Although the details of this reason are unknown, it seems that, because heat (infrared radiation) generated from an illuminator or light signal-emitting instrument is probably absorbed by the heat absorptive coat, the luminous body acts in order to compensate for this, and the quantity of visible light also increases, and it becomes bright. Moreover, in addition to these phenomena, when heat is absorbed by a precoated metal sheet of the present invention via a heat absorptive coat, the temperature of the precoated metal sheet rises, the temperature of the visible light reflective coat also rises, the refractive index of a binder resin in the visible light reflective coat becomes low, the refractive index difference between an added pigment, such as titanium oxides, and the binder resin becomes large, a visible ray reflectance of the visible light reflective coat improves, and the light of the illumination or light signal becomes brighter.

Figure 2:
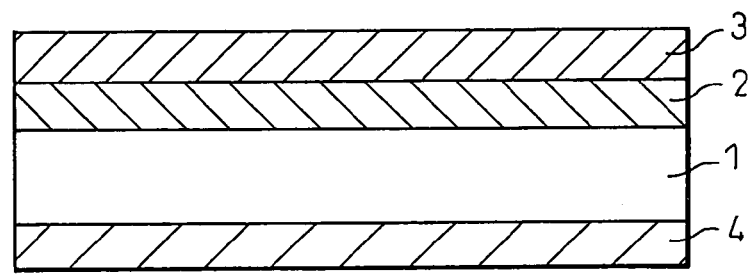
FIG. 2 is a schematic sectional view illustrating another embodiment of a precoated metal sheet according to the present invention.

Furthermore, it is also considered to be one of causes of the brightness improvement that the heat emitted out of the instrument is absorbed by the heat absorptive coat, the temperature in the instrument falls, electronic circuits of a control board and the like provided in the instrument work efficiently, the electric current loss spent on the light emission decreases, and the quantity of light increases. One embodiment of a precoated metal sheet for light reflectors comprising a heat absorptive coat according to the present invention is illustrated in FIG. 2. It comprises a metal sheet 1, a visible light reflective undercoat 2 and a visible light reflective overcoat 3 provided on one surface of the metal sheet 1, and a heat absorptive coat 4 provided on the other surface of the metal sheet 1.

A visible light reflective undercoat and a visible light reflective overcoat of the precoated metal sheet of the present invention preferably have a diffuse reflectance of visible rays of not less than 0.7 in the wavelength of 400 to 700 nanometers. A diffuse reflectance of visible rays of less than 0.7 is unsuitable because it does not improve a visible light reflective function and makes dark an illumination or a luminous body. Preferably, a diffuse reflectance of visible rays in 555 nanometers is not less than 0.8. This is because a wavelength range which in particular contributes to brightness in the wavelength range of visible rays is generally known to be from 550 to 555 nanometers. In the present invention, a diffuse reflectance is a spectral reflectance factor described in JIS Z 8722.2(2), and is also referred to as spectral reflectance. It can be measured according to JIS Z 8722.4. An increase of a diffuse reflectance of a visible light reflective undercoat or overcoat is achieved by adding a visible light reflective pigment in the coat.

A total emissivity of the heat absorptive coat in the range of wave number of 600 to 3,000 $cm^{-1}$ measured at a certain temperature within the range of from 80 to 200 degrees centigrade is preferably not less than 0.70. Because rays having a wave number of less than 600 $cm^{-1}$ or more than 3,000 $cm^{-1}$ have a very small influence on heat, an emissivity including rays having such a wave number is inappropriate. Moreover, a heat absorptive function declines when the total emissivity is less than 0.7.

Hereinafter, common knowledge about heat absorption is described. It is known that heat is a part of the electromagnetic radiations emitted from an object and that when heat radiation rays enter an object, a part of them reflects, a part of them transmits, and the remaining part of them is absorbed. See, for example, Nishikawa and Fujita, "Mechanical-engineering basic lecture; Electrothermics" published by Rikogakusha Publishing Co., Ltd. When heat radiation rays enter a metal sheet, because heat radiation ray scarcely transmits through the metal sheet, the heat radiation rays either reflect or are absorbed. When heat radiation rays generated from an illuminator or a light signal-emitting instrument enter a light reflector surface, if most of heat radiation rays incident on the surface reflect, the temperature of the instrument will rise, and on the other hand, if most of heat radiation rays are absorbed on the light reflector surface, the temperature of the instrument will fall.

A reflection method using an infrared spectrophotometer is well known as a method of examining the reflectance of heat radiation rays incident to a surface of a metal sheet and the like. When the reflectance is measured by this method, however, if the roughness on a surface of a metal sheet is coarse, the incident heat radiation rays will reflect diffusively and, therefore, it is difficult to obtain a highly precise absorption coefficient. According to Kirchhoff's law on heat radiation, at a constant temperature, an absorptivity and an emissivity of an object are the same. See, for example, Nishikawa and Fujita, "Mechanical-engineering basic lecture; Electrothermics" published by Rikogakusha Publishing Co., Ltd.

It is preferred that the heat absorptive coat comprises 10 to 150 parts by weight of a heat absorptive pigment, based on 100 parts by weight of a solid content of the binder of the coat, in order to improve the emissivity of the heat absorptive coat. A heat absorptive pigment content of less than 10 parts by weight is not preferable because the emissivity tends to become less than 0.7. A heat absorptive pigment content of more than 150 parts by weight is also not preferable because the storage stability of a coating material of the coat is bad.

Publicly known heat absorptive pigments can be used as the heat absorptive pigment, examples of which include aniline black, polymethylene dyes, tris azo dye amine salts, cyanine dyes or metal complexes thereof, anthraquinone-based pigments, phthalocyanine-based pigments, iron oxides, carbons, and the like. Among these publicly known heat absorptive pigments, a carbon is preferred because it radiates infrared rays in a broad range of wave number.

Publicly known carbons, such as carbon black, charcoal, graphite, can be used as the carbon. A carbon to be added is preferably a mixture of a carbon having a particle size of less than 0.1 micrometers (hereinafter referred to as "a small particle size carbon") and a carbon having a particle size of from 0.1 (inclusive) to 30 (exclusive) micrometers (hereinafter referred to as "a large particle size carbon"). A content of the small particle size carbon is preferably from 1 to 20 parts by weight, and a content of the large particle size carbon is preferably from 1 to 140 parts by weight, and a total content of the small and large particle size carbons is preferably 10 to 150 parts by weight, based on 100 parts by weight of a solid content of the binder. Although a minimum particle size of the small particle size carbon is not limited, it is not preferable that a maximum particle size thereof is not less than 0.1 micrometer because interstices between carbon particles tend to be formed and it becomes difficult for it to play a role as a small particle size carbon. It is not preferable that a content of the small particle size carbon is less than 1 part by weight because there is a possibility of an inferior effect for opacifying the metal sheet and of an inferior heat absorptivity. It is also not preferable that a content thereof is more than 20 parts by weight because there is a possibility that a viscosity of the coating liquid may become high or the coating liquid may be gelled when time passes. It is not preferable that the large particle size carbon has a particle size of less than 0.1 micrometer because it does not play a role as a large particle size carbon and it behaves in the same manner as a small particle size carbon does. It is not preferable that the large particle size carbon has a particle size of not less than 30 micrometers because there is a possibility that applicability may decline when applying a coating liquid comprising such a carbon or the appearance of a coat after coating becomes bad. It is not preferable that a content of the large particle size carbon is less than 1 part by weight because there is a possibility that a heat absorptivity may be inferior. It is also not preferable that a content thereof is more than 140 parts by weight because there is a possibility that the coat may become weak and the workability of the coat may be inferior. Furthermore, it is not preferable that a total content of the small and large particle size carbons is less than 10 parts by weight because there is a possibility of an inferior heat absorptivity. It is also not preferable that the total content is more than 150 parts by weight, because there is a possibility that the coat becomes weak and then the formability of the coat is inferior or there is a possibility that the coating liquid thickens and then the coating workability is inferior.

A thickness of the heat absorptive coat is not limited, but is preferably not less than 1 micrometer. It is not preferred that a thickness of the heat absorptive coat is less than 1 micrometer because the heat absorptivity may be inferior. Although a maximum thickness thereof is not limited, too large a thickness tends to cause poor appearance, such as coating unevenness. Therefore, it is necessary to select the thickness suitably as required. Generally, the thickness is preferably less than 100 micrometers.

In addition to a heat absorptive pigment, the heat absorptive coat preferably comprises from 1 to 50 parts by weight of conductive metal powder, based on 100 parts by weight of the solid content of the binder, as a conductive pigment to make the precoated metal sheet conductive. It is preferable that the heat absorptive coat is conductive because the light reflector can secure grounding, and static electricity is hardly generated in the light reflector and, therefore, dust is hardly attached. It is not preferable that a content of the metal powder is less than 1 part by weight because the obtained conductivity is small. It is also not preferable that a content thereof is more than 50 parts by weight because the formability of the coat tends to decline. Examples of the conductive metal powder used include, but are not limited to, aluminum, nickel, stainless steels, copper, silver, magnesium, zinc, tin. The shape of metal powder is not limited, but need be selected suitably because the degree of conductivity may vary with shapes and some shapes hinder the heat absorptivity. As far as the inventors know, a combination of a flaky metal and a chain-form metal is more preferred. A chain-form metal is preferably used because an area reflecting heat in the coat becomes small and the heat absorption is hard to prevent. However, it is better to combine a chain-form metal with a flaky metal because there is a possibility that conductivity is inferior when using only a chain-form metal. A weight ratio of a flaky metal to a chain-form metal is preferably in the range between 0.1/1 and 6/1 because a heat absorptivity and conductivity are excellent. Because a flaky metal has a large area reflecting heat in the coat, there is a possibility of preventing heat absorption. Therefore, the conductivity is inferior when the weight ratio of a flaky metal to a chain-form metal may be less than 0.1/1. There is a possibility that the heat absorptivity may be inferior when the ratio is more than 6/1. Among metals, nickel is preferred because it hardly prevents heat absorption of a heat absorptive pigment compared with other metals.

The same binder resins as binder resins constituting the visible light reflective undercoat can be used as a binder resin constituting the heat absorptive coat.

The visible light reflective undercoat, the visible light reflective overcoat, or the heat absorptive coat can further comprise a color pigment, a rust preventing pigment, or a rust preventive, if necessary, in addition to a titanium oxide, a heat absorptive pigment, and a conductive pigment. However, when trying to improve the visible light reflectance of the visible light reflective undercoat or overcoat, a coat consisting only of a binder resin and a titanium oxide is more preferable because the diffuse reflectance of visible light is improved. If a pigment other than a titanium oxide is added in the visible light reflective undercoat or overcoat, interfaces having a small difference of refractive index will occur between a binder resin and a pigment other than a titanium oxide, and a visible light diffuse reflectance of the coat declines. However, from a standpoint of appearance or corrosion protection, if necessary, a pigment other than a titanium oxide may be added to the visible light reflective undercoat or overcoat.

Publicly known inorganic or organic color pigments are used as the color pigment. Examples of inorganic color pigments include zinc oxide (ZnO), zirconium oxide ($ZrO_2$), calcium carbonate ($CaCO_3$), barium sulfate ($BaSO_4$), alumina ($Al_2O_3$), kaolin clay, and iron oxides ($Fe_2O_3$, $Fe_3O_4$).

Examples of the rust preventing pigment or rust preventive include publicly known chromium-containing rust preventive pigments such as strontium chromate and calcium chromate, and publicly known chromium-free rust preventing pigments or rust preventives such as zinc phosphate, zinc phosphite, aluminum phosphate, aluminum phosphite, molybdates, phosphate/molybdate salts, vanadate/phosphate mixture pigments, silica, and Ca-adsorbed silicas called calcium silicates. When a base metal of the precoated metal sheet is an easily corrosive metal such as a steel sheet or a plated steel sheet, it is preferable that a rust preventing pigment or rust preventive is added in order to improve the corrosion resistance of the precoated metal sheet. Chromium-free rust preventing pigments or rust preventives are more effective if the environmental problems of recent years are considered. As a chromium-free rust preventing pigment or rust preventive, either a reagent or a commercially available one may be used. Examples of commercially available rust preventing pigments include zinc phosphate-based rust preventing pigments "EXPERT™-NP500" and "EXPERT™-NP530" by Toho Ganryo Co., Ltd., zinc phosphite-based rust preventing pigments "EXPERT™-NP1500", "EXPERT™-NP1530", "EXPERT™-NP1600" and "EXPERT™-NP1700" by Toho Ganryo Co., Ltd., aluminum triphosphates "K-WHITE" series by Tayca Corporation, molybdate-based pigments or phosphate/molybdate-based pigments "SHER-WHITE" series by the Sherwin-Williams Company, fumed silicas "AEROSIL™" series by Nippon Aerosil Co., Ltd. or Degussa Japan Co., Ltd., colloidal silicas "SNOWTEX™" series by Nissan Chemical Industries, Ltd., calcium ion adsorbed silicas "SHIELDEX™" series by GRACE, and the like. Two or more of these rust preventing pigments can be used in combination. Among these chromium-free rust preventing pigments, a calcium ion adsorbed silica alone or a combination of a calcium ion adsorbed silica and a phosphate-based rust preventing pigment is preferred because it is excellent in the corrosion resistance and press-formability of the precoated metal sheet. A combination of a calcium ion adsorbed silica and aluminum triphosphate is more preferred.

It is necessary to suitably select a type, an addition amount, and a particle size of these color pigments, rust preventing pigments, or rust preventives as required because the coat performances, such as an emissivity, workability, appearance, and corrosion resistance, vary with them.

Publicly known additives such as leveling agents, pigment dispersants, waxes, delustering agents, and the like can be added, if necessary, to the heat absorptive coat. However, the visible light reflective undercoat or overcoat preferably does not comprise such an additive because such an additive reduces the diffuse reflectance of visible light. However, if necessary for the coating workability or the coat performances, such an additive may be added also to the visible light reflective undercoat or overcoat. The type or content of the additive is not limited, and can be selected suitably as required. In particular, a wax is effective in improving the formability of the precoated metal sheet, and in preventing the heat absorptive coat from cracking, and the like.

A low visible light regular reflectance of a light reflector is sometimes preferred, depending on applications of a precoated metal sheet for light reflectors of the present invention. If the regular reflectance of a light reflector is high, the reflected light does not diffuse and only a specific part becomes bright, or the image of the light source, such as an electric bulb and a fluorescent lamp, is reflected on the light reflector surface. In a light reflector of a liquid crystal television set, for example, unless light is diffuse-reflected more uniformly and transmitted to a liquid crystal display, there is a possibility that the light and shade of brightness may occur in an image in a liquid crystal display. Light reflectors for such an application sometimes require a low regular reflectance of visible lights. It is known that a regular reflectance of visible lights has a negative correlation with a gloss of a surface of the visible light reflective coat, and that the lower the gloss is, the lower the regular reflectance becomes. Therefore, one preferred means of reducing the visible light regular reflectance of the visible light reflective coat is the addition of a delustering agent to the visible light reflective undercoat or overcoat. The delustering agent to be used may be a publicly known delustering agent, and silicas or silica-based pigments are effective. Among silica-based pigments, a metal ion adsorbed silica is preferred because it also improves the corrosion resistance. Publicly known silicas can be used as silica for the delustering agent. Examples thereof include fumed silicas "AEROSIL™" series by Nippon Aerosil Co., Ltd. or Degussa Japan Co., Ltd., colloidal silicas "SNOWTEX™" series by Nissan Chemical Industries, Ltd. and the like. Calcium ion adsorbed silicas "SHIELDEX™" series by GRACE can be used as the metal ion adsorbed silica. However, unless a low regular reflectance of visible light or a low gloss is demanded, it is preferred that the visible light reflective undercoat or overcoat does not comprise a delustering agent and the like and consists only of a binder resin and a titanium oxide because the diffuse reflectance is higher than when it comprises a delustering agent.

In order to form a visible light reflective undercoat and a heat absorptive coat on a surface of the metal sheet and in order to form a visible light reflective overcoat on a surface of the visible light reflective undercoat, the metal sheet can be coated with components, including a binder, of the coat in a publicly known form of a coating material. Examples of the form include solvent-based coating materials in which a resin is dissolved in a solvent, aqueous coating materials in which an emulsified resin is dispersed in water and the like, powder coating materials obtained by pulverizing a resin into a powder, slurry powder coating materials in which a pulverized resin is dispersed in water and the like, ultraviolet (UV) curable coating materials, electron beam (EB) curable coating materials, film lamination in which a resin is formed into a film shape and the film is laminated, and melt coating in which a resin is melted and applied. Examples of a coating method adopted include, but are not limited to, roll coating, roller curtain coating, curtain flow coating, air spray coating, airless spray coating, brush coating, die coater coating, and other publicly known coating methods. Among them, roll coating, roller curtain coating, curtain flow coating, and die coater coating are preferred because continuous process is possible and production efficiency is improved.

A primer coat may be provided under the visible light reflective undercoat or the heat absorptive coat for the purpose of rust proofing or masking. Publicly known binders, rust preventing pigments, and color pigments can be used for the primer coat. Commercially available coating materials may be used for the primer coat. The same binders, rust preventing pigments, and color pigments as the above-mentioned ones used for the visible light reflective undercoat or overcoat or the heat absorptive coat may be used. A primer coat under the visible light reflective coat preferably comprises 40 to 250 parts by weight of a visible light reflective pigment, preferably a titanium oxide, based on 100 parts by weight of the solid content of the binder because the diffuse reflectance of the visible light reflective undercoat or overcoat is improved. A thickness of the primer coat is preferably, but is not limited to, from 1 to 40 micrometers. When the thickness is less than 1 micrometer, there is a possibility that the primer coat does not play a role such as masking or corrosion resistance. When the thickness is more than 40 micrometers, there is a possibility that the coating workability declines. The same binder resins as those used for the visible light reflective undercoat or overcoat or the heat absorptive coat can be used for the primer coat. Moreover, publicly known additives such as color pigments, rust preventing pigments, leveling agents, pigment dispersants, waxes, delustering agents, and the like can be added, if necessary, to the primer coat as well as to the visible light reflective undercoat or overcoat or the heat absorptive coat. In particular, the addition of a rust preventing pigment to the primer coat is preferred because it improves the corrosion resistance of the precoated metal sheet. A chromium-free rust preventing pigment is preferably used. Among chromium-free rust preventing pigments, a calcium ion adsorbed silica alone or a combination of a calcium ion adsorbed silica and a phosphate-based rust preventing pigment is preferred because it is excellent in the corrosion resistance and press-formability of the precoated metal sheet. A combination of a calcium ion adsorbed silica and aluminum triphosphate is more preferred. When a primer coat is provided under the visible light reflective coat, a delustering agent is preferably added in the primer coat in order to reduce a visible light regular reflectance of the visible light reflective coat. Publicly known delustering agents can be used as a delustering agent in the primer coat, and silica-based delustering agents and the like are well-known.

In addition, a surface of the metal sheet is preferably pretreated before coating the visible light reflective undercoat or the heat absorptive coat in order to increase the coat adhesion. Examples of such a pretreatment include a chromate coating treatment, an electrolytic chromate treatment, a zinc phosphate treatment, a zirconia-based treatment, a titania-based treatment, and other publicly known treatments. Non-chromate pretreatment using an organic compound such as a resin, which has been developed in recent years, is preferred because the load on the environment is reduced. Examples of non-chromate pretreatment using an organic compound such as a resin include treatments described in Japanese Unexamined Patent Publications No. Hei 09-828291, No. Hei 10-251509, No. Hei 10-337530, No. 2000-17466, No. 2000-248385, No. 2000-273659, No. 2000-282252, No. 2000-265282, No. 2000-167482, or No. 2002-266081, and other publicly known treatments. A commercially available chromate treatment may be used. The type and coating weight of the pretreatment need to be suitably selected, if necessary, because the adhesion of the heat absorptive coat and the corrosion resistance of the precoated metal sheet vary greatly with the type or coating weight.

Publicly known materials can be used as a base metal of the metal sheet of the precoated metal sheet according to the present invention. The base metal may be an alloy. Examples of the metal sheet include steel sheets, aluminum sheets, titanium sheets, copper sheets, and the like. A surface of the metal sheet may be plated, for example, with zinc, aluminum, copper, or nickel, as well as alloys. Examples of a steel sheet used as the metal sheet include cold rolled sheet steels, hot rolled sheet steels, hot dip zinc coated steel sheets, electrogalvanized steel sheet, hot dip alloyed galvanized steel sheets, aluminum-plated steel sheets, aluminum-zinc alloyed plated steel sheets, stainless steel sheets, and other publicly known steel sheets and plated steel sheets.

A surface roughness Ra of the metal sheet or plated metal sheet is preferably 0.05 to 1.8 micrometers because the diffuse reflectance is improved. When visible rays enter a surface of the visible light reflective overcoat, visible rays passing through the visible light reflective overcoat and undercoat without being reflected are reflected on a surface of the base metal sheet under the coats. The inventors found out that, when the surface roughness of the base metal sheet was much smaller than the visible ray wavelengths (the wavelength region of visible rays is usually 380 to 780 nanometers), visible rays incident on the base metal surface are hard to diffuse-reflect and easy to regular-reflect. On the other hand, when the surface roughness of the base metal sheet is much larger than the wavelengths of visible rays, visible rays incident on the base metal surface enter the interstices between the unevenness on the surface of a base metal and are easily absorbed by the base metal. Therefore, it is not preferable that a surface roughness Ra of the metal sheet or plated metal sheet which is the base metal is less than 0.05 micrometers because it is hard to diffuse-reflect visible rays. It is also not preferable that the Ra is more than 1.8 micrometers because visible rays transmitting the visible light reflective coat without reflected and reaching the metal sheet or plated metal sheet which is a base metal are easily absorbed by the base metal surface.

The metal sheet may be subjected to an usual treatment, such as hot water rinsing, alkaline degreasing, and acid pickling, prior to performing the before-coating pretreatment. A sheet steel or plated steel sheet is preferably used as the metal sheet because the forming workability of the precoated metal sheet is improved.

A reflector production efficiency improves if the reflector is produced by forming a precoated metal sheet of the present invention. A reflector can be produced by a publicly known forming method, examples of which include blanking, bending, deep drawing, stretch forming, roll forming, and other forming methods.

In an electric or electronic apparatus comprising a precoated metal sheet according to the present invention, because the precoated metal sheet has a high diffuse reflectance of visible rays and an excellent heat absorptivity, the light of illumination or light signal become brighter and the temperature in the instrument falls, and therefore, electronic circuits of a control board and the like provided in the instrument can work efficiently and stably. Examples of the electric or electronic apparatus include illuminators, audiovisual equipment, mobile computing devices, plasma displays, liquid crystal television sets.

EXAMPLE 1

The methods of preparing coating materials for the visible light reflective undercoat and the visible light reflective overcoat used in the experiments will be explained in details below.

A commercially available organic solvent soluble amorphous polyester resin "VYLON™ GK140" having a number average molecular weight of 13,000 and a Tg of 20 degrees centigrade by Toyobo Co., Ltd. (hereinafter referred to as the polyester resin) was dissolved in an organic solvent which was a mixture of 50 percents by weight of Solvesso™ 150 and 50 percents by weight of cyclohexanone.

Subsequently, 15 parts by weight of a commercially available hexamethoxymethylmelamine "CYMEL™ 303" by Mitsui Cytec, Ltd. and 0.5 parts by weight of a commercially available acid catalyst "Catalyst™ 6003B" by Mitsui Cytec, Ltd., based on 100 parts by weight of the solid content of the polyester resin, were added to the polyester resin dissolved in the organic solvent. The resultant mixture was agitated to obtain a melamine curable polyester-based clear coating material, which is hereinafter referred to as the polyester/melamine-based coating material.

Furthermore, a commercially available trifluoroethylene resin "LUMIFLON™ LF552" having a number average molecular weight of 12,000, a hydroxyl value of 52 mg-KOH/g and a Tg of 20 degrees centigrade by Asahi Glass Co., Ltd. was blended with a commercially available HDI (hexamethylene diisocyanate)-based blocking isocyanate "Sumidur™ BL3175" by Sumitomo Bayer Urethane Co., Ltd. at a value [NCO group of isocyanate in equivalents]/[OH group of polyester resin in equivalents] of 1.0, and further 0.05 parts by weight of a reaction catalyst "TK-1" by Mitsui Takeda Chemicals, Inc., based on 100 parts by weight of the solid content of the resin, was added to obtain a fluorine-based clear coating material, which is hereinafter referred to as the fluorine-based coating material A.

Furthermore, a commercially available trifluoroethylene resin "LUMIFLON™ LF810Y" having a number average molecular weight of 12,000, a hydroxyl value of 9 mg-KOH/g and a Tg of 45 degrees centigrade by Asahi Glass Co., Ltd. was used, without adding a crosslinking agent, as a fluorine-based clear coating material, which is hereinafter referred to as the fluorine-based coating material B.

Subsequently, a titanium oxide "TIPAQUE CR95" by Ishihara Sangyo Kaisha, Ltd. was added to the prepared clear coating materials and was agitated to obtain visible light reflective undercoat materials and visible light reflective overcoat materials. A silica "AEROSIL™ 300" by Nippon Aerosil Co., Ltd. or a calcium ion adsorbed silica "SHIELDEX™ C303" by GRACE was further added to some of the coating materials. The details of types of used clear coating materials and the content of the titanium oxide are shown in Table 1.

TABLE 1

| Coating Material No. | Resin | | Content of titanium oxide (Part by weight) | Silica-based pigment | |
|---|---|---|---|---|---|
| | Type of clear coating material | Part by weight | | Type | Part by weight |
| C-I-1 | Polyester/melamine-based | 100 | 20 | — | — |
| C-I-2 | Polyester/melamine-based | 100 | 65 | — | — |
| C-I-3 | Polyester/melamine-based | 100 | 100 | — | — |
| C-I-4 | Polyester/melamine-based | 100 | 130 | — | — |

TABLE 1-continued

| Coating Material No. | Resin Type of clear coating material | Part by weight | Content of titanium oxide (Part by weight) | Silica-based pigment Type | Part by weight |
|---|---|---|---|---|---|
| C-I-5 | Polyester/melamine-based | 100 | 160 | — | — |
| C-I-6 | Polyester/melamine-based | 100 | 200 | — | — |
| C-I-7 | Polyester/melamine-based | 100 | 100 | Silica | 3 |
| C-I-8 | Polyester/melamine-based | 100 | 80 | Ca silicate | 20 |
| C-I-9 | Polyester/melamine-based | 100 | 200 | Silica | 1 |
| C-I-10 | Fluorine-based A | 100 | 20 | — | — |
| C-I-11 | Fluorine-based A | 100 | 65 | — | — |
| C-I-12 | Fluorine-based A | 100 | 80 | — | — |
| C-I-13 | Fluorine-based A | 100 | 100 | — | — |
| C-I-14 | Fluorine-based A | 100 | 130 | — | — |
| C-I-15 | Fluorine-based A | 100 | 160 | — | — |
| C-I-16 | Fluorine-based A | 100 | 200 | — | — |
| C-I-17 | Fluorine-based A | 100 | 100 | Silica | 3 |
| C-I-18 | Fluorine-based A | 100 | 200 | Silica | 3 |
| C-I-19 | Fluorine-based B | 100 | 100 | — | — |

The method for preparing a precoated metal sheet used in the experiment will be explained in detail below.

A metal sheet having a thickness of 0.6 millimeters was alkali-degreased at 60 degrees centigrade in an aqueous solution containing 2 percent by weight of a commercially available alkali degreasing agent "FC4336" by Nihon Parkerizing Co., Ltd., and then was rinsed with water and dried. Subsequently, a conversion treatment liquid was applied on the degreased metal sheet using a roll coater, and then the sheet was dried with hot air at a peak metal temperature of 60 degrees centigrade.

The following metal sheets were used in this experiment. Roughnesses of these metal sheets were adjusted by rolling the metal sheets with a reduction roll in order to make the roughnesses of the metal sheets almost the same.

CR: a commercially available cold rolled steel sheet (Material: SPCE (JIS G3141), Surface roughness Ra: 1.0 micrometer)

EG: a commercially available electrogalvanized steel sheet (Electroplated zinc weight: 20 g/m² on one side, Material: SECE (JIS G3313), Surface roughness Ra: 0.9 micrometers)

AL: a commercially available pure aluminum sheet (Material: 1100 (JIS H4000), Surface roughness Ra: 0.8 micrometers)

AL-Mg: a commercially available Al-Mg-based aluminum alloy sheet (Material: 5082 (JIS H4000), Surface roughness Ra: 0.8 micrometers)

A commercially available non-chromate conversion treatment "CT-E300" by Nihon Parkerizing Co., Ltd. (hereinafter referred to as the non-chromate treatment) were used as a conversion treatment in this experiment. Both surfaces of a metal sheet were conversion-treated with a roll coater, and then were dried at a peak metal temperature of 60 degrees centigrade. The coating weight of the conversion treatment was 150 milligrams of the total coating weight per square meter.

Subsequently, a coating material described in Table 1 as a visible light reflective undercoat material was applied on one surface of the conversion-treated metal sheet, and a general-purpose back coating material FL100HQ by Nippon Fine Coatings, Inc. was applied on the other surface by a roll coater, and then dried and cured at a peak metal temperature (PMT) of 210 degrees centigrade in an induction heating furnace using hot air in combination. Subsequently, a coating material described in Table 1 as a visible light reflective overcoat material was applied on the surface coated with the visible light reflective undercoat material by a roll coater, and then dried and cured at a peak metal temperature (PMT) of 230 degrees centigrade in an induction heating furnace using hot air in combination. The details of the precoated metal sheets (PCM) prepared are shown in Table 2. The thickness of each coat in Table 2 was a thickness after the coat was dried. The thickness of the back coating material was 5 micrometers when dried. In this connection, precoated metal sheets PCM-I-27 to PCM-I-30 and PCM-I-35 in Table 2 were obtained by applying a visible light reflective undercoat material and a visible light reflective overcoat material three times each with a bar coater because the visible light reflective undercoats and visible light reflective overcoats of these precoated metal sheets were too thick to apply by a roll coater.

TABLE 2

| Precoated metal sheet | Metal sheet | Visible light reflective undercoat | | Visible light reflective overcoat | | Note |
|---|---|---|---|---|---|---|
| | | Coating material | Thickness (μm) | Coating material | Thickness (μm) | |
| PCM-I-1 | EG | C-I-2 | 10 | C-I-13 | 20 | — |
| PCM-I-2 | EG | C-I-3 | 10 | C-I-13 | 20 | — |
| PCM-I-3 | EG | C-I-4 | 10 | C-I-13 | 20 | — |
| PCM-I-4 | EG | C-I-7 | 10 | C-I-13 | 20 | — |
| PCM-I-5 | EG | C-I-8 | 10 | C-I-13 | 20 | — |
| PCM-I-6 | EG | C-I-3 | 10 | C-I-11 | 20 | — |
| PCM-I-7 | EG | C-I-3 | 10 | C-I-12 | 20 | — |
| PCM-I-8 | EG | C-I-3 | 10 | C-I-14 | 20 | — |
| PCM-I-9 | EG | C-I-7 | 10 | C-I-17 | 20 | — |
| PCM-I-10 | EG | C-I-8 | 10 | C-I-17 | 20 | — |
| PCM-I-11 | EG | C-I-3 | 10 | C-I-17 | 20 | — |
| PCM-I-12 | EG | C-I-3 | 5 | C-I-13 | 20 | — |
| PCM-I-13 | EG | C-I-3 | 15 | C-I-13 | 20 | — |
| PCM-I-14 | EG | C-I-3 | 25 | C-I-13 | 20 | — |
| PCM-I-15 | EG | C-I-3 | 10 | C-I-13 | 15 | — |
| PCM-I-16 | EG | C-I-3 | 10 | C-I-13 | 25 | — |
| PCM-I-17 | EG | C-I-13 | 10 | C-I-13 | 20 | — |
| PCM-I-18 | CR | C-I-3 | 10 | C-I-13 | 20 | — |
| PCM-I-19 | AL | C-I-3 | 10 | C-I-13 | 20 | — |
| PCM-I-20 | AL—Mg | C-I-3 | 10 | C-I-13 | 20 | — |
| PCM-I-21 | EG | C-I-3 | 10 | C-I-19 | 20 | |
| PCM-I-22 | EG | C-I-3 | 15 | C-I-13 | 40 | — |
| PCM-I-23 | EG | C-I-1 | 10 | C-I-10 | 20 | — |
| PCM-I-24 | EG | C-I-5 | 10 | C-I-15 | 20 | — |
| PCM-I-25 | EG | C-I-6 | 10 | C-I-16 | 20 | — |
| PCM-I-26 | EG | C-I-9 | 10 | C-I-18 | 20 | — |

TABLE 2-continued

| Precoated metal sheet | Metal sheet | Visible light reflective undercoat | | Visible light reflective overcoat | | Note |
|---|---|---|---|---|---|---|
| | | Coating material | Thickness (μm) | Coating material | Thickness (μm) | |
| PCM-I-27 | EG | C-I-9 | 80 | C-I-18 | 20 | a) |
| PCM-I-28 | EG | C-I-9 | 80 | C-I-9 | 20 | a) |
| PCM-I-29 | AL | C-I-9 | 80 | C-I-18 | 20 | a) |
| PCM-I-30 | AL | C-I-9 | 80 | C-I-9 | 20 | a) |
| PCM-I-31 | EG | C-I-3 | 5 | C-I-3 | 15 | — |
| PCM-I-32 | EG | C-I-3 | 1 | C-I-13 | 5 | — |
| PCM-I-33 | EG | C-I-3 | 1 | C-I-13 | 20 | — |
| PCM-I-34 | EG | C-I-3 | 10 | C-I-13 | 3 | — |
| PCM-I-35 | EG | C-I-3 | 50 | C-I-13 | 50 | a) |
| PCM-I-36 | EG | — | — | C-I-12 | 10 | b) |

Note:
a) Impossible to apply by a roll coater.
b) There is no visible light reflective undercoat.

Test methods for evaluating the precoated metal sheets prepared will be explained in detail below.

1) Visible Ray Diffuse Reflectance of Visible Light Reflective Overcoat

Visible ray diffuse reflectance of a visible light reflective overcoat surface of the prepared precoated metal sheet was measured in a wavelength range of from 400 to 700 nanometers using a spectrophotometer "UV265" by Shimadzu Corp. with an integrating sphere reflective attachment being additionally attached, and the integral value of the obtained wavelength-reflectance curve was determined. Moreover, a visible ray diffuse reflectance in the wavelength of 555 nanometers which contributes to brightness most was also measured. A reference used was barium sulfate made by Merck & Co., Inc. which is a white specimen according to German DIN standard (DIN5033), and the diffuse reflectance of each coat was determined when the diffuse reflectance of the reference was defined as 1.00.

2) Gloss of Visible Light Reflective Overcoat

A specular gloss of a visible light reflective overcoat surface of a precoated metal sheet was measured at an incidence angle of 60 degrees and an acceptance angle of 60 degrees according to JIS K 5400.7.6.

3) Illumination of Illuminator

Figure 3:
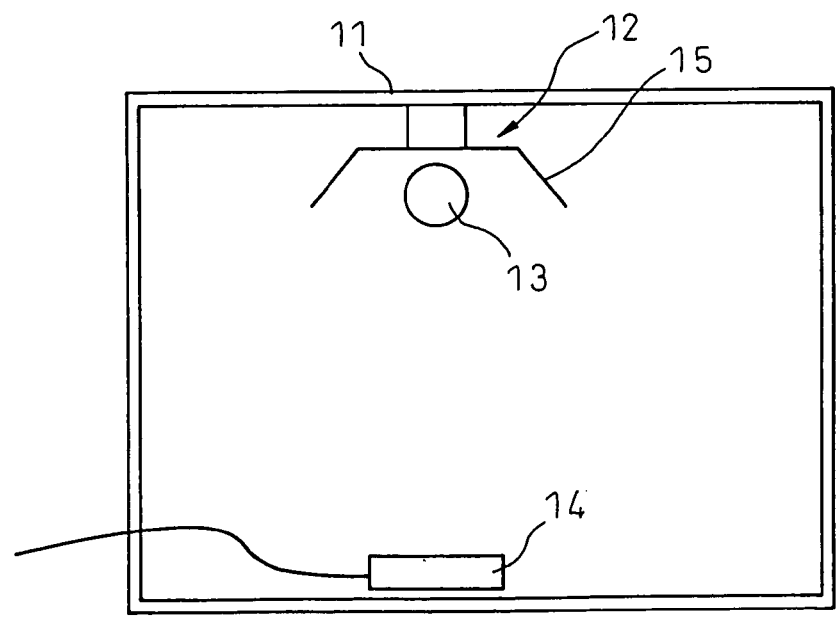
FIG. 3 is a sketch of an instrument for measuring illumination.

A sketch of an instrument used for measuring illumination is shown in FIG. 3. A commercially available fluorescent illuminator 12 was attached in a wooden case 11. A sensor 14 of a commercially available illuminometer was placed at a distance of 30 centimeters from a fluorescent lamp 13, and then illumination was measured. An light reflector 15 originally attached to the purchased fluorescent illuminator 12 (hereinafter referred to as the conventional light reflector) was removed. A light reflector 15 having the same shape as that of the conventional light reflector 15 was formed using each of the prepared precoated metal sheets. Illumination was measured when each formed light reflector 15 was attached to the illuminator 12 as well as when the conventional light reflector 15 was attached to the illuminator 12. A 16-watt fluorescent lamp 13 was used in this experiment. Each precoated metal sheet was evaluated by comparing the illumination measured when a light reflector 15 made of the precoated metal sheet was attached with the illumination measured when the conventional light reflector 15 was attached as follows:

"Very good" when the illumination rate is not less than 110 percent,

"Good" when the illumination rate is not less than 103 percent and less than 110 percent, and "Bad" when the illumination rate is less than 103 percent, wherein the illumination rate is defined as [illumination measured when a light reflector made of a precoated metal sheet was attached]/[illumination measured when the conventional light reflector was attached]×100.

4) Bend Test of Coat of Precoated Metal Sheet

Workability

A prepared precoated metal sheet was bent in close contact at a bend angle of 180 degrees at 20 degrees centigrade, and the damaged condition of the coat at the bent portion was observed with a magnifying lens. The workability was evaluated according to the following criterion. This test employed 3T bending in which the precoated metal sheet specimen was bent in close contact at a bending angle of 180 degrees while three sheets having the same thickness as the precoated metal sheet to be evaluated are inserted inside.

"Good" when there is no damage in the coat,

"Normal" when the coat is damaged partially, and

"Bad" when the coat is violently damaged all over the bent portion.

5) Cupping Formability of Precoated Metal Sheet

A cupping test was performed on the conditions of a punch diameter of 50 millimeters, a punch shoulder R (radius of a punch shoulder) of 3 millimeters, a dice shoulder R (radius of the shoulder of a dice) of 3 millimeters, and a draw ratio of 2.1. At the time of the cupping test, a press test was performed without applying a press oil to the precoated metal sheet surface and with the visible light reflective overcoat surface being outside of the cup. The formability of a precoated metal sheet was evaluated as follows:

"Very good" when the precoated metal sheet can be formed into the designated shape completely without fracture of the base metal in the middle of forming, and no damage of the coat is visually observed.

"Good" when the base metal is fractured in the middle of forming the precoated metal sheet, but neither clear coat peeling nor coat damage is visually observed at the formed portion.

"Bad" when clear coat peeling or coat damage is visually observed regardless of the base metal being fractured in the middle of forming the precoated metal sheet.

6) Corrosion Resistance of Precoated Metal Sheet

A method of evaluating a corrosion resistance of the surface is described below.

A cut crack is given to the visible light reflective overcoat surface of the prepared precoated metal sheet, and thereafter a salt spray test was performed according to the method described in JIS K 5400.9.1. Salt water was sprayed on the surface having a cut crack. Test time was 120 hours. The width of coat blister from the cut crack on the surface was measured and the corrosion resistance was evaluated as follows:

"Good" when the blister width is not more than 3 millimeters on one side,

"Normal" when the blister width is less than 5 millimeters on one side, and

"Bad" when the blister width is more than 5 millimeters on one side.

7) Conductivity of Heat Absorptive Coat of Precoated Metal Sheet

A conductivity of a heat absorptive coat of the precoated metal sheet prepared was measured. An electric resistivity of a surface of a heat absorptive coat of the precoated metal sheet was measured by the four probe method using a resistivity meter "Loresta-EP/MCP-T360" by Mitsui Chemicals, Inc., and the conductivity was evaluated according to the following criterion:

"Good" when the electric resistivity is less than $0.1 \times 10^{-2}$ ohms,

"Normal" when the electric resistivity is not less than $0.1 \times 10^{-2}$ ohms and less than $1.0 \times 10^{-1}$ ohms, and "Bad" when the electric resistivity is not less than $1.0 \times 10^{-1}$ ohms.

The prepared precoated metal sheets were evaluated by the above-mentioned test methods. In the bend test (workability), only the visible light reflective overcoat side of the precoated metal sheet was evaluated. Table 3 shows the evaluation results.

content of a titanium oxide in the visible light reflective overcoat is 80 to 130 parts by weight based on 100 parts by weight of a solid content of the binder resin because the diffuse reflectance of the visible light reflective overcoat becomes higher.

Precoated metal sheets comprising a silica or a silica-based pigment in at least one of the visible light reflective undercoat and the visible light reflective overcoat (PCM-I-9 to PCM-I-11) have a low gloss visible light reflective coat. Therefore, they are preferred because the image of a light source is hardly reflected, in the light reflector, when they are used as a light reflector. In particular, a precoated metal sheet using a metal ion-adsorbed silica as a silica-based pigment (PCM-I-10) is more preferred because the corrosion resistance

TABLE 3

| Precoated metal sheet | Diffuse reflectance 400-700 nm | Diffuse reflectance 555 nm | Gloss | Illumination | Workability | Cupping formability | Corrosion resistance |
|---|---|---|---|---|---|---|---|
| PCM-I-1 | 0.89 | 0.92 | 90.3 | Very good | Good | Very good | Normal |
| PCM-I-2 | 0.90 | 0.93 | 90.3 | Very good | Good | Very good | Normal |
| PCM-I-3 | 0.90 | 0.93 | 90.3 | Very good | Good | Very good | Normal |
| PCM-I-4 | 0.90 | 0.93 | 90.3 | Very good | Good | Very good | Normal |
| PCM-I-5 | 0.90 | 0.93 | 90.3 | Very good | Good | Very good | Normal |
| PCM-I-6 | 0.87 | 0.91 | 95.2 | Very good | Good | Very good | Normal |
| PCM-I-7 | 0.88 | 0.92 | 93.1 | Very good | Good | Very good | Normal |
| PCM-I-8 | 0.88 | 0.92 | 90.0 | Very good | Good | Very good | Normal |
| PCM-I-9 | 0.88 | 0.91 | 48.2 | Very good | Good | Very good | Normal |
| PCM-I-10 | 0.88 | 0.91 | 47.1 | Very good | Good | Very good | Good |
| PCM-I-11 | 0.89 | 0.92 | 50.1 | Very good | Good | Very good | Normal |
| PCM-I-12 | 0.86 | 0.88 | 90.1 | Good | Good | Very good | Normal |
| PCM-I-13 | 0.87 | 0.90 | 90.0 | Good | Good | Very good | Normal |
| PCM-I-14 | 0.92 | 0.95 | 90.2 | Very good | Good | Very good | Normal |
| PCM-I-15 | 0.87 | 0.90 | 90.3 | Good | Good | Very good | Normal |
| PCM-I-16 | 0.92 | 0.94 | 90.4 | Very good | Good | Very good | Normal |
| PCM-I-17 | 0.92 | 0.94 | 90.2 | Very good | Good | Very good | Normal |
| PCM-I-18 | 0.89 | 0.91 | 90.3 | Very good | Good | Very good | Normal |
| PCM-I-19 | 0.91 | 0.94 | 90.3 | Very good | Good | Good | Good |
| PCM-I-20 | 0.92 | 0.94 | 90.3 | Very good | Good | Good | Good |
| PCM-I-21 | 0.91 | 0.94 | 85.0 | Very good | Good | Very good | Normal |
| PCM-I-22 | 0.92 | 0.95 | 90.1 | Very good | Good | Very good | Normal |
| PCM-I-23 | 0.72 | 0.75 | 95.3 | Bad | Good | Very good | Normal |
| PCM-I-24 | 0.88 | 0.90 | 90.3 | Very good | Normal | Bad | Normal |
| PCM-I-25 | 0.86 | 0.89 | 85.2 | Very good | Bad | Bad | Normal |
| PCM-I-26 | 0.86 | 0.88 | 21.5 | Very good | Bad | Bad | Normal |
| PCM-I-27 | 0.87 | 0.90 | 9.6 | Very good | Bad | Bad | Normal |
| PCM-I-28 | 0.87 | 0.90 | 10.6 | Very good | Bad | Bad | Normal |
| PCM-I-29 | 0.90 | 0.92 | 9.8 | Very good | Bad | Bad | Good |
| PCM-I-30 | 0.90 | 0.92 | 11.2 | Very good | Bad | Bad | Good |
| PCM-I-31 | 0.77 | 0.80 | 90.3 | Bad | Good | Very good | Normal |
| PCM-I-32 | 0.68 | 0.71 | 90.5 | Bad | Good | Very good | Normal |
| PCM-I-33 | 0.80 | 0.82 | 90.2 | Bad | Good | Very good | Normal |
| PCM-I-34 | 0.78 | 0.80 | 90.1 | Bad | Good | Very good | Normal |
| PCM-I-35 | 0.92 | 0.95 | 90.4 | Very good | Good | Very good | Normal |
| PCM-I-36 | 0.82 | 0.84 | 90.2 | Bad | Good | Very good | Normal |

When a precoated metal sheet has a visible light reflective undercoat which has a thickness of 3 to 30 micrometers and comprises a binder resin and 40 to 150 parts by weight of a titanium oxide, based on 100 parts by weight of a solid content of the binder resin, on a metal sheet or plated metal sheet and a visible light reflective overcoat which has a thickness of 10 to 40 micrometers and comprises a binder resin containing a fluororesin, particularly a trifluoroethylene resin, and 40 to 150 parts by weight of a titanium oxide, based on 100 parts by weight of a solid content of the binder resin, on the visible light reflective undercoat (PCM-I-1 to PCM-I-22), the diffuse reflectances of the visible light reflective undercoat and overcoat are high. Therefore, an illuminator using this precoated metal sheet as a light reflector is preferred because the brightness of illumination increases. It is more preferred that the improves as well as the gloss of the visible light reflective coat declines. However, a precoated metal sheet comprising a silica or a silica-based pigment in at least one of the visible light reflective undercoat and the visible light reflective overcoat has a lower diffuse reflectance of visible lights than one comprising no silica or a silica-based pigment. Therefore, it is more preferred that the visible light reflective undercoat and the visible light reflective overcoat consist only of a binder resin and a titanium oxide in respect of a high diffuse reflectance.

It is preferable that a metal sheet used for a precoated metal sheet of the present invention is a steel sheet or plated steel sheet (PCM-I-1 to PCM-I-18, and PCM-I-21) because the cupping formability of the precoated metal sheet improves.

It is preferred that a hydroxyl value of a trifluoroethylene resin used as a binder resin of the visible light reflective overcoat is not more than 10 mg-KOH/g and a content of the crosslinking agent is not more than 20 parts by weight based on 100 parts by weight of the trifluoroethylene resin (PCM-I-21) because the diffuse reflectance of visible rays improves.

It is not preferable that a titanium oxide content in the visible light reflective undercoat or a visible light reflective overcoat of a precoated metal sheet is less than 40 parts by weight based on 100 parts by weight of a solid content of the binder resin (PCM-I-23) because the diffuse reflectance is low and the illumination when using such a precoated metal sheet for a light reflector of an illuminator does not become high. It is not preferable that a titanium oxide content in a visible light reflective undercoat or a visible light reflective overcoat of a precoated metal sheet is more than 150 parts by weight based on 100 parts by weight of a solid content of the binder resin (PCM-I-24 to PCM-I-30) because the coat become weak and the workability or cupping formability declines although the diffuse reflectance of the coated surface hardly improves or, in the case of the visible light reflective overcoat using a fluorine-based binder resin, does decline. It is not preferable that a thickness of the visible light reflective undercoat is less than 3 micrometers or a thickness of the visible light reflective overcoat is less than 10 micrometers (PCM-I-32 to PCM-I-34) because the diffuse reflectance of the coated surface is low and illumination does not become high. It is not preferable that a thickness of the visible light reflective undercoat is more than 30 micrometers or a thickness of the visible light reflective overcoat is more than 40 micrometers (PCM-I-27 to PCM-I-30 and PCM-I-35) because the coats cannot be applied by a roll coater which is a common continuous coating system of a precoated steel sheet. It is not preferable that the binder resin of the visible light reflective overcoat of the precoated metal sheet is not a fluororesin (PCM-I-31) because the diffuse reflectance of the coated surface is low and the illumination does not become high.

EXAMPLE 2

The method for preparing a precoated metal sheet used in the experiment will be explained in detail below.

A metal sheet having a thickness of 0.6 millimeters was alkali-degreased, rinsed with water, dried and thereafter coated with the conversion treatment liquid using a roll coater and dried with hot air in the same manner as the method for preparing a precoated metal sheet in Example 1. Subsequently, the coating material C-I-3 described in Table 1, as a visible light reflective undercoat material, was applied at a thickness of 15 micrometers on one surface of the conversion-treated metal sheet, and a general-purpose back coating material FL100HQ by Nippon Fine Coatings, Inc. was applied at a thickness of 5 micrometers on the other surface by a roll coater, and then dried and cured in an induction heating furnace using hot air in combination. Further, the coating material C-I-13 described in Table 1 as a visible light reflective overcoat material was applied at a thickness of 25 micrometers on the visible light reflective undercoat surface by a roller curtain coater, and then dried and cured in an induction heating furnace using hot air in combination. The conditions of the alkali degreasing, the conversion treatment, the drying and curing of each coating material, and the like were the same as those in Example 1. The details of the prepared precoated metal sheets are shown in Table 4.

The following metal sheets were used in this example. A surface roughness of each metal sheet was adjusted by rolling the metal sheet with a reduction roll. The surface roughness Ra of each metal sheet used in this experiment is shown in Table 4.

GI: a commercially available hot dip zinc coated steel sheet (Hot dip coated zinc weight: 60 g/m$^2$ on one side, Material: SGCD3 (JIS G3302))

AL: a commercially available pure aluminum sheet (Material: 1100 (JIS H4000))

SUS: a commercially available stainless steel sheet (Material: SUS430 (JIS G4310))

Visible ray diffuse reflectance of a visible light reflective coat of the prepared precoated metal sheets was measured as described in 1) of Example 1. In this measurement, only the diffuse reflectance of a 555-nanometer visible ray was measured.

The measured results are shown in Table 4.

TABLE 4

| Precoated metal sheet | Metal sheet | | Visible light reflective undercoat | | Visible light reflective overcoat | | Diffuse reflectance (555 nm) |
|---|---|---|---|---|---|---|---|
| | Type | Surface roughness Ra (μm) | Coating material | Thickness (μm) | Coating material | Thickness (μm) | |
| PCM-II-1 | GI | 0.16 | C-I-3 | 15 | C-I-13 | 25 | 0.95 |
| PCM-II-2 | GI | 0.64 | C-I-3 | 15 | C-I-13 | 25 | 0.95 |
| PCM-II-3 | AL | 0.12 | C-I-3 | 15 | C-I-13 | 25 | 0.95 |
| PCM-II-4 | AL | 0.04 | C-I-3 | 15 | C-I-13 | 25 | 0.93 |
| PCM-II-5 | SUS | 0.03 | C-I-3 | 15 | C-I-13 | 25 | 0.93 |
| PCM-II-6 | GI | 1.92 | C-I-3 | 15 | C-I-11 | 25 | 0.93 |

A surface roughness Ra of the metal sheet of the precoated metal sheet is preferably 0.05 to 1.8 micrometers (PCM-II-1 to PCM-II-3) because the diffuse reflectance is larger when Ra is 0.05 to 1.8 micrometers than when Ra is less than 0.05 micrometers (PCM-II-4 and PCM-II-5) or more than 1.8 micrometers (PCM-II-6).

EXAMPLE 3

Precoated metal sheets comprising a heat absorptive coat were prepared and evaluated in this example.

The methods of preparing precoated metal sheets used in the experiment will be explained in detail below.

A commercially available electrogalvanized steel sheet (Electroplated zinc weight: 20 g/m$^2$ on one side, Material: SECE (JIS G3313), Surface roughness Ra: 0.9 micrometers, Thickness: 0.6 millimeters) was alkali-degreased, rinsed with water, dried and thereafter coated with the conversion treatment liquid using a roll coater and dried with hot air in the same manner as the method for preparing a precoated metal sheet in Example 1. Subsequently, the coating material C-I-3 described in Table 1 as a visible light reflective undercoat material was applied at a thickness of 15 micrometers on one surface of the conversion-treated metal sheet, and a back coating material was applied at a thickness of 5 micrometers on the other surface by a roll coater, and then dried and cured in an induction heating furnace using hot air in combination. Further, the coating material C-I-13 described in Table 1 as a visible light reflective overcoat material was applied at a thickness of 20 micrometers on the visible light reflective undercoat surface by a roller curtain coater, and then dried and cured in an induction heating furnace using hot air in combination. The conditions of the alkali degreasing, the conversion treatment, the drying and curing of each coating material, and the like were the same as those in Example 1. The details of the prepared precoated metal sheets are shown in Table 5.

Here, the following coating materials were used as the back coating material in this experiment.

General-purpose back coating material: a back coating material FL100H (Color: grey) by Nippon Fine Coatings, Inc.

Heat absorptive coating material: A heat absorptive coating material was prepared as follows. Firstly, a commercially available organic solvent soluble amorphous polyester resin "VYLON™ GK140" having a number average molecular weight of 13,000 and a Tg of 20 degrees centigrade by Toyobo Co., Ltd. was dissolved in an organic solvent which was a mixture of 50 percent by weight of Solvesso™ 150 and 50 percent by weight of cyclohexanone. Subsequently, 15 parts by weight of a commercially available hexamethoxymethylmelamine "CYMEL™ 303" by Mitsui Cytec, Ltd. and 0.5 parts by weight of a commercially available acid catalyst "Catalyst 6003B" by Mitsui Cytec, Ltd., based on 100 parts by weight of the solid content of the polyester resin, were added to the polyester resin dissolved in the organic solvent. The resultant mixture was agitated to obtain a melamine curable polyester-based clear coating material. Fifteen parts by weight of a carbon black "TOKABLACK #7350F" by Tokai Carbon Co., Ltd. and 5 parts by weight of a conductive pigment consisting of a mixture of a commercially available flaky metal nickel and a commercially available chain-form metal nickel having a weight ratio [flaky metal nickel]/[chain-form metal nickel] of 6/1, based on 100 parts by weight of a solid content of the resin in the clear coating material, were added to this clear coating material. The resultant mixture was agitated to prepare a heat absorptive coating material.

Methods for evaluating the prepared precoated metal sheets will be explained in detail below.

1) Visible Ray Diffuse Reflectance of Visible Light Reflective Overcoat

Visible ray diffuse reflectance of a visible light reflective overcoat surface of the prepared precoated metal sheet was measured in the same manner as described in 1) of Example 1, except that only a visible ray diffuse reflectance in the wavelength of 555 nanometers was measured.

2) Emissivity of Precoated Metal Sheet

An infrared emission spectrum of the back coated surface of the prepared precoated metal sheet was measured in a wave number range of from 600 to 3000 cm$^{-1}$ at a sheet temperature of 80 degrees centigrade using a Fourier transform infrared spectrophotometer "VALOR-III" by Jasco Corp., and was compared with an emission spectrum of a standard black body to determine the total emissivity of the metal sheet. In this connection, an iron sheet which was spray-coated with "THI-1B Black Spray", manufactured by Okitsumo Inc. and sold by Tasco Japan Inc., to a coat thickness of 30±2 micrometers was used as the standard black body.

3) Illumination of Illuminator

An illumination was measured in the same manner as described in 3) of Example 1.

The evaluation results are shown in Table 5. A precoated metal sheet comprising a heat absorptive coat having a total emissivity of infrared rays of not less than 0.7 in a wave number range of from 600 to 3000 cm$^{-1}$ at 80 degrees centigrade on the back surface (PCM-III-2) has a higher illumination than a precoated metal sheet coated with the general-purpose back coating material having the total emissivity of infrared rays of less than 0.7 on the back surface (PCM-III-1). A illuminator employing a precoated metal sheet comprising a heat absorptive coat became brighter.

TABLE 5

| PCM No. | Back coating material | Diffuse reflectance | Emissivity | Illumination |
|---|---|---|---|---|
| PCM-III-1 | General-purpose back coating material | 0.9 | 0.4 | Normal |
| PCM-III-2 | Heat absorptive coating material | 0.9 | 0.8 | Good |

INDUSTRIAL APPLICABILITY

The present invention has made it possible to provide the technology for improving the brightness of the light of an illuminator or a light signal-emitting instrument. The present invention has made possible not only the improvement of the performance of these apparatus, but also securing performance equivalent to the former with a smaller energy consumption than the former, and has also made possible providing an energy saved apparatus. Therefore, it can be said that the present invention has valuable industrial applicability.

The invention claimed is:

1. A precoated metal sheet for light reflectors, comprising a metal sheet or plated metal sheet, a visible light reflective undercoat having a thickness of 3 to 30 micrometers provided on at least one surface of the metal sheet or plated metal sheet, and a visible light reflective overcoat having a thickness of 10 to 40 micrometers provided on the visible light reflective undercoat, wherein the visible light reflective undercoat comprises a binder resin and a titanium oxide, a content of the titanium oxide in the visible light reflective undercoat being 40 to 150 parts by weight based on 100 parts by weight of a solid content of the binder resin in the visible light reflective undercoat, and the visible light reflective overcoat comprises a fluororesin-containing binder resin and a titanium oxide, a content of the titanium oxide in the visible light reflective overcoat being 40 to 150 parts by weight based on 100 parts by weight of a solid content of the binder resin in the visible light reflective overcoat.

2. A precoated metal sheet for light reflectors according to claim 1, wherein the visible light reflective overcoat has a thickness of 10 to 30 micrometers.

3. A precoated metal sheet for light reflectors according to claim 1, wherein the fluororesin contained in the binder resin of the visible light reflective overcoat is a trifluoroethylene resin.

4. A precoated metal sheet for light reflectors according to claim 1, wherein at least one of the visible light reflective undercoat and the visible light reflective overcoat consists only of a binder resin and a titanium oxide.

5. A precoated metal sheet for light reflectors according to claim 1, wherein at least one of the visible light reflective undercoat and the visible light reflective overcoat comprises at least one of a silica and a silica-based pigment.

6. A precoated metal sheet for light reflectors according to claim 5, wherein the silica-based pigment is a metal ion-adsorbed silica.

7. A precoated metal sheet for light reflectors according to claim 1, comprising a visible light reflective undercoat and a visible light reflective overcoat on one surface of the metal sheet or plated metal sheet and, further, a heat absorptive coat on the other surface of the metal sheet or plated metal sheet, wherein the heat absorptive coat has a total emissivity of infrared rays of not less than 0.7 in the range of wave number of 600 to 3,000 cm$^{-1}$ measured at a certain temperature within the range of from 80 to 200 degrees centigrade.

8. A precoated metal sheet for light reflectors according to claim 1, wherein the surface roughness Ra of the metal sheet or plated metal sheet is 0.05 to 1.8 micrometers.

9. A precoated metal sheet for light reflectors according to claim 1, wherein the metal sheet or plated metal sheet is a steel sheet or a plated steel sheet.

10. An electric or electronic apparatus comprising a precoated metal sheet for light reflectors according to claim 1.

* * * * *